:

2,818,420
SEPARATION OF ALKALI METAL SALTS OF MONO- AND DIALKYL ACID PHOSPHATES

Jacobus Bastiaan De Jonge, Amsterdam, Netherlands, assignor to Shell Development Company, Emeryville, Calif., a corporation of Delaware No Drawing. Application January 7, 1954
Serial No. 402,809

Claims priority, application Netherlands February 2, 1953

7 Claims. (Cl. 260—461)

This invention relates to a process for separating monoalkyl esters of phosphoric acid from dialkyl esters of phosphoric acid.

A class of chemical compounds possessing highly desirable properties as surface-active agents comprises the alkyl acid phosphates, which can be prepared by reaction of higher aliphatic alcohols, such as nonyl, decyl, or lauryl alcohols, with phosphorus pentoxide. The products of this reaction are mixtures comprising primarily monoalkyl acid phosphates and dialkyl acid phosphates. While the surface-active properties of the mixtures of phosphates thus obtained are sufficient for some purposes, it has been found that the dialkyl acid phosphates possess surface-active properties substantially more desirable in kind and degree than those possessed by the monoalkyl acid phosphates; therefore, for many purposes, it becomes quite important that the two classes of acid phosphates be separated. It has been proposed to effect the separation of a mixture of mono- and dialkyl acid phosphates by fractional crystallization of suitable salts, particularly the barium salts, of these acid phosphates from water solutions. However, as stated by G. M. Kosolapoff ("Organophosphorus Compounds," Wiley and Sons (1950), at page 221 thereof) this separation method has not been found to be effective in separating the (higher alkyl-substituted) acid phosphates. It is the object of the present invention, therefore, to provide an effective, easily performed method for accomplishing the separation of mono(higher alkyl) acid phosphates from di(higher alkyl) acid phosphates and, hence, to provide a practical method for obtaining in substantially pure form the more desirable monoalkyl acid phosphate.

It is my discovery that, in contrast to the statement of Kosolapoff (supra), mono(higher alkyl) acid phosphates may be almost completely removed from a mixture of mono(higher alkyl)- and di(higher alkyl) acid phosphates by extracting a mixture of the alkali metal salts of these acid phosphates with water. To be more specific, it has been discovered that when an alkali metal salt of a monoalkyl acid phosphate in which the alkyl group contains at least 7 carbon atoms is present in admixture with a corresponding alkali metal salt of the corresponding dialkyl acid phosphate, the salt of the monoalkyl acid phosphate can be selectively extracted from the mixture by means of water as selective solvent. The process of the invention, therefore, comprises intimately contacting a mixture of the alkali metal salts of alkyl-substituted acid phosphates with water and separating the solution from the solid residue (which comprises the alkali metal salt of the dialkyl phosphate). In another aspect the process of the invention comprises converting the mixture of alkyl-substituted acid phosphates to the corresponding alkali metal salts, extracting the mixture of salts with water, separating the solution from the solid, evaporating the water and treating the solid thus obtained with a weak acid solution to convert it to the desired monoalkyl acid phosphate. In still another aspect, the invention comprises selectively extracting the mixture of mono- and dialkyl acid phosphates with a solution of an alkali metal hydroxide in water or, alternatively, fractionally crystallizing an alkali metal salt of the dialkyl acid phosphate from the reaction mixture of an alkali metal hydroxide and a mixture of mono- and dialkyl acid phosphates, recovering the alkali metal salt of the monoalkyl acid phosphate from the solvent and springing the monoalkyl acid phosphate by treating the salt with a weak acid solution. The dialkyl acid phosphate may be recovered in each case by treating the solid residue from the extraction with a weak acid solution to spring the dialkyl acid phosphate.

The mixtures of alkyl-substituted acid phosphates to which this novel method of separation applies are mixtures of those acid phosphates in which the alkyl groups each contain at least 7 carbon atoms and a preferred class of these mixtures comprises mixtures of mono- and dialkyl-substituted acid phosphates in which each alkyl group contains from 8 to 18 carbon atoms, inclusive. The alkyl group may be of straight-chain configuration or it may have a branched-chain structure. Representative mixtures include, among others, mixtures of mono- and dinonyl acid phosphates, mono- and didecyl acid phosphates, mono- and dilauryl acid phosphates, mono- and dicetyl acid phosphates, mono- and dimyristyl acid phosphates, mono- and di-(3,5,5-trimethylhexyl) acid phosphates, mono- and di-(2,2,4-trimethylpentyl) acid phosphates, mono- and di-(2,3-dimethylhexyl) acid phosphates, and the like. A preferred mixture comprises that obtained by the reaction of those higher aliphatic alcohols known to the art as "oxo alcohols"—mixtures of aliphatic alcohols containing from about 8 to about 18 carbon atoms per molecule—with phosphorus pentoxide.

By the term "akali metal" is meant one of the metals of group I of the periodic table of the elements customarily designated by this terminology—e. g., lithium, sodium, potassium, and rubidium. It is preferred to use the hydroxide of sodium, inasmuch as this hydroxide is lower in cost and is more readily available than are the hydroxides of the other alkali metals.

The separation of the monoalkyl acid phosphate from the mixture of mono- and dialkyl acid phosphates is accomplished by converting both of these classes of acid phosphates to their alkali metal salts, forming an aqueous mixture of these salts and filtering off the undissolved solid, which consists primarily of the alkali metal salt of the dialkyl acid phosphate.

The precise physical procedure by which the separation of the alkali metal salts is effected is determined in any particular case by the particular reactants involved and the economic factors which must be considered. For example, the separation process may comprise essentially a selective extraction process, an aqueous solution of an alkali metal hydroxide being employed as solvent. Alternatively, the separation comprise fractional crystallization of an alkali metal salt of the dialkyl acid phosphate from the reaction mixture formed by the reaction of the hydroxide with the mixture of acid phosphates. A still further method comprises isolating the mixture of the alkali metal salts of the alkyl-substituted acid phosphates and extracting the mixture with water as selective solvent.

In any case, the alkali metal hydroxide must be added in an amount at least sufficient to convert all of the alkyl-substituted acid phosphates to the corresponding alkali metal salts, and it is desirable, to insure complete conversion, that a slight excess of the hydroxide be used. A large excess, however, is to be avoided, for the reason that excess hydroxide must be neutralized before the desired monoalkyl acid phosphate can be sprung (by treatment with a weak acid solution) from the salt. Thus, a large excess of hydroxide results in an unnecessary waste of the acid used to spring the monoalkyl acid phosphate, a highly undesirable result. A convenient method for determining the excess of hydroxide present comprises measuring the pH of the solution. When determined by this technique, the desired excess of hydroxide is such that the final pH of the solution lies above about 8.0. It is preferred that the final pH of the solution lie between about 9.0 and about 11.5, the optimum pH being about 10.0.

It is essential that any non-aqueous material present be removed before separation of the salts is attempted, since the solubility characteristics of the various salts in solvents other than water may be such as to interfere with the desired separation. Such non-aqueous liquid materials may be removed by distillation, or like methods, prior to treatment of the mixture of the acid phosphates with the hydroxide (this case being that where the mixture of acid phosphates results from the reaction of one or more higher alcohols with phosphorus pentoxide, or they may be removed by such methods as steam distillation following the treatment with the hydroxide.

The temperature at which the conversion of the alkyl-substituted acid phosphates to their alkali metal salts may be effected may be any temperature lying within the range of from about room temperature up to about 100° C. Preferably, the conversion is effected at a temperature of from about 20° C. up to about 70° C.

Where the metallic salts are separated by selective extraction with water, the separation generally may be effected by intimately contacting the mixture of salts with water at about room temperature. However, in some cases somewhat higher or lower temperatures—for example, temperatures lying within the range of from about 10° C. to about 100° C.—may be employed with advantage. The amount of water employed will depend upon the particular mixture of salts to be separated. As a general rule, a moderate excess of water over that required to effect complete solution of the salt of the monoalkyl acid phosphate should be employed. Smaller amounts may be employed. Where an excess is used, the excess preferably is restricted to not over about 5% by weight over that required for complete solution of the salt of the monoalkyl acid phosphate since the metallic salt of the dialkyl acid phosphate, although relatively insoluble in the solvent as compared to the metallic salt of the dialkyl acid phosphate, may be slightly soluble in water and the employment of an amount of water equal to or greater than the amount of water required to effect complete solution of the metallic salt of the monoalkyl acid phosphate would result in an unnecessary loss of the metallic salt of the dialkyl acid phosphate and, further, would reduce the degree of separation.

Where the method employed is that of a selective extraction or fractional crystallization with the alkali metal hydroxide solution as the liquid medium, the amount of alkali metal hydroxide and the amount of water present in the mixture and the temperature employed each must lie within the limits stated heretofore for conducting the extraction with water. Where a fractional crystallization is conducted, it has been found to be most desirable that the mixture of alkyl-substituted acid phosphates be treated with the alkali metal hydroxide solution at about room temperatures, the mixture heated to its boiling temperature and then cooled in controlled manner to effect the desired crystallization.

The desired metallic salt of the dialkyl-substituted acid phosphate remains as a residue following the extraction and may be further purified by washing one or more times with distilled water. The salt may be converted to the dialkyl ester by any of the methods known in the art for preparing organic acids from their salts. A suitable method consists of treating the metallic salt with an acid, for example, a mineral acid such as hydrochloric acid in dilute aqueous solution, evaporating the solution to dryness and separating the alkyl ester from the inorganic salt formed by means of a suitable organic solvent, such as a lower aliphatic alcohol or an aliphatic hydrocarbon.

The monoalkyl acid phosphate may be obtained by a similar method. The aqueous solution may be treated with the mineral acid to spring the alkyl ester, the solution evaporated to dryness and the ester removed by selective extraction as outlined above for the dialkyl acid phosphate.

The invention is illustrated by the following specific example. It is to be understood that there is no intention to limit the invention in any manner to any details of this example since many variations may be made within the scope of the claimed invention.

*Example 1*

A mixture of phosphates resulting from the reaction of 152 grams of phosphorus pentoxide and 608 grams of 3,5,5-trimethyl hexanol was treated with 1 N aqueous sodium hydroxide solution until the pH of the mixture was 11.0. The unreacted alcohol was removed by steam distillation, the reaction mixture cooled to 0° C. and filtered. The portion filtered off amounted to 336 grams of a dry solid consisting of sodium dinonyl phosphate 99½% by weight, water 0.5% by weight. The solvent was evaporated from the filtrate. The residue amounted to 303 grams of a dry solid having the following analysis: Sodium monononyl phosphate 94.7%, sodium dinonyl phosphate 0.9%, sodium phosphate 3.4% and water 1.0%.

I claim as my invention:

1. A process for the separation of the alkali metal salt of a monoalkyl acid phosphate from a mixture of the alkali metal salt of a monoalkyl acid phosphate and the alkali metal salt of a dialkyl acid phosphate, in each of which phosphates each alkyl group contains at least seven carbon atoms, which comprises selectively extracting the mixture of the alkali metal salts of the said acid phosphates with water, and separating the solid alkali metal salt of the dialkyl acid phosphate from the liquid phase, which liquid phase comprises a water solution of the alkali metal salt of the monoalkyl acid phosphate.

2. A process according to claim 1 wherein each alkyl group of the salts of the mono- and dialkyl acid phosphates contains from about 8 to about 18 carbon atoms.

3. A process according to claim 2 in which the amount of water used is from 0% to 5% by weight in excess of the amount of water required to completely dissolve the alkali metal salt of the monoalkyl acid phosphate.

4. A process for the separation of a monoalkyl acid phosphate from a mixture of mono- and dialkyl acid phosphates in each of which phosphates each alkyl group contains at least seven carbon atoms which comprises intimately contacting a mixture of said acid phosphates with an aqueous solution of an alkali metal hydroxide to form the alkali metal salts of the said mono- and dialkyl acid phosphates and to selectively dissolve the said alkali metal salt of the monoalkyl acid phosphate and filtering off the solid alkali metal salt of the dialkyl acid phosphate from the solution.

5. A process according to claim 4 in which the alkali metal hydroxide is added until the pH of the resulting solution lies above about 8.0.

6. A process according to claim 5 wherein each alkyl group of the salts of the mono- and dialkyl acid phosphates contains from about 8 to about 18 carbon atoms.

7. A process according to claim 6 in which the amount of water used is from 0% to 5% by weight in excess of the amount of water required to completely dissolve the alkali metal salt of the monoalkyl acid phosphate.

(References on following page)

References Cited in the file of this patent

UNITED STATES PATENTS

| | | |
|---|---|---|
| 1,869,768 | Nicolai et al | Aug. 2, 1932 |
| 2,193,965 | Hochwalt | Mar. 19, 1940 |
| 2,673,658 | Weesner | Oct. 30, 1951 |
| 2,658,909 | Crandall et al | Nov. 10, 1953 |

OTHER REFERENCES

Chemical Trade Journal & Chemical Engineer, page 62, Jan. 16, 1942.

Kosolapoff: Organo Phosphorus Compounds, page 221, 1950.

Stewart: Jour. A. C. S., v. 73, pp. 1377–8, 1951.